United States Patent [19]

Oizumi et al.

[11] Patent Number: 4,652,091
[45] Date of Patent: Mar. 24, 1987

[54] COMPACT ZOOM LENS WITH SHORT BACK FOCAL DISTANCE

[75] Inventors: Kouji Oizumi; Yasuhisa Sato, both of Kanagawa; Yasuyuki Yamada, Tokyo; Hiroki Nakayama, Kanagawa, all of Japan

[73] Assignee: Canon Kabushiki Kaisha

[21] Appl. No.: 752,139

[22] Filed: Jul. 3, 1985

[30] Foreign Application Priority Data

Jul. 9, 1984 [JP] Japan ............... 59-142057

[51] Int. Cl.⁴ ............................. G02B 15/14
[52] U.S. Cl. .................... 350/427; 350/450
[58] Field of Search .......... 350/423, 427, 450

[56] References Cited

U.S. PATENT DOCUMENTS 4,462,664 7/1984 Moskovich ............ 350/427

FOREIGN PATENT DOCUMENTS

0199312 11/1983 Japan .

Primary Examiner—John K. Corbin
Assistant Examiner—Rebecca D. Gass
Attorney, Agent, or Firm—Toren, McGeady and Goldberg

[57] ABSTRACT

A compact zoom lens is constructed with, from front to rear, first, second and third lens units of positive, negative and positive refractive powers, respectively. A diaphragm is positioned in or adjacent the second lens unit. The second lens unit and the diaphragm are stationary. When zooming from the wide angle end to the telephoto end, the first and third lens units are axially moved in such a manner that each of the separations between the first and second lens units and between the second and third lens units is increased monotonically.

5 Claims, 20 Drawing Figures

COMPACT ZOOM LENS WITH SHORT BACK FOCAL DISTANCE

BACKGROUND OF THE INVENTION

This invention relates to compact zoom lenses, and more particularly to compact zoom lenses with a short back focal distance and a simple operating mechanism suited to lens-shutter type cameras.

DESCRIPTION OF THE PRIOR ART

A known compact zoom lens is constructed with three lens units of positive, negative positive powers, respectively, all of which are axially movable for zooming. Such a system is proposed in Japanese Laid-Open Patent Application No. SHO 58-199312.

Figure 1:
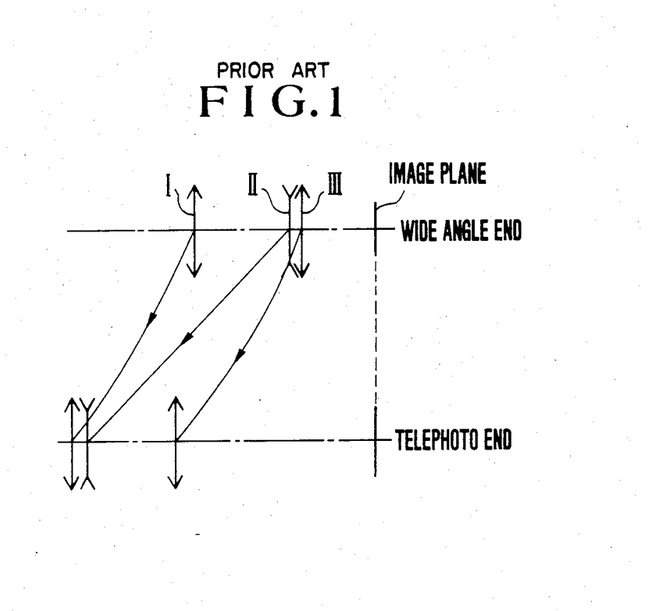
FIG. 1 is a schematic view of the prior known zoom lens.

FIG. 1 schematically shows such a zoom lens. The separation between the first and second lens units I and II is monotonically decreased, while the separation between the second and third lens units II and III is simultaneously increased monotonically, to vary the focal length of the entire system from the minimum to the maximum value. This feature results in a zoom lens of relatively short back focal distances.

Such prior known zoom lenses, however, tend to increase the complexity of structure of the necessary operating mechanism therefore, because they employ three movable lens units for zooming.

This prior known zoom lens utilizes a diaphragm positioned in the space between two successive lens units. The diaphragm cooperates mechanically with an exposure control apparatus mounted on the camera housing. Thus, another drawback to such a zoom lens is that accommodating for the change of the distance between the exposure control apparatus and the diaphragm complicates the structure of the drive connection mechanism and necessarily increases its size. As a result, it is difficult to build this prior known zoom lens system into a compact camera.

SUMMARY OF THE INVENTION

A first object of the present invention is to provide a zoom lens having a short distance from the frontmost lens surface to the image plane.

A second object is to reduce the necessary number of moveable lens units and simplify the structure of the operating mechanism for the lens.

A third object is to provide a stationary diaphragm during zooming, thereby eliminating the need for a complex operating mechanism therefor.

BRIEF DESCRIPTION OF THE DRAWINGS

FIGS. 9A and 9B to FIGS. 14A and 14B are graphic representations of the lenses of FIGS. 3 to 8 respectively.

DETAILED DESCRIPTION OF THE PREFERRED EMBODIMENTS

Figure 2:
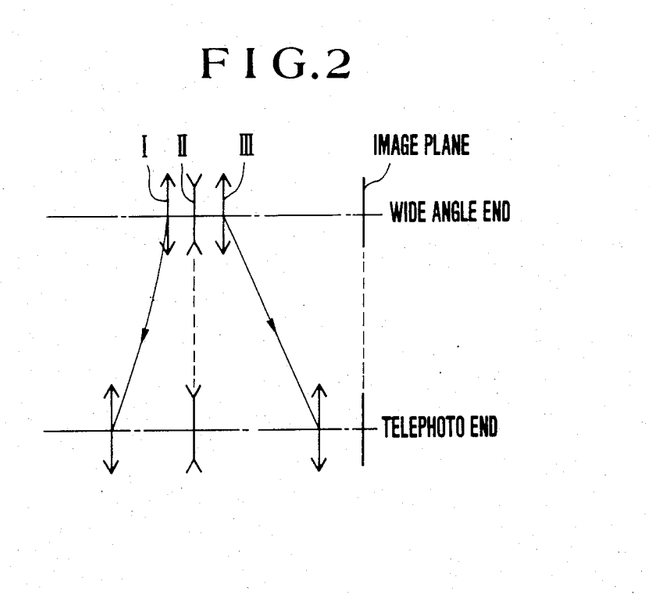
FIG. 2 is a schematic view illustrating an embodiment of the present invention.

FIG. 2 shows a zoom lens of the invention utilizing a thin lens system, where I, II and III denote first, second and third lens units, respectively. To increase the focal length, the third lens unit of positive power is moved rearward to principally perform the function of varying the image magnification. The first lens unit of positive power is simultaneously moved forward to maintain the position of an image plane constant.

The combined refractive power of the first and second lens units is made positive over the entire zooming range. The pencil of rays transferring from the first to the second lens units, and the pencil of rays transferring from the second to the third lens unit are both made convergent. The diameters of the second and third lens units are thus reduced, and the physical length of the lens is shortened. Accordingly, the zoom lens is shortened in the lateral and longitudinal directions.

Still another feature of the invention is that the combined refractive power of the first and second lens units is made positive over the entire zooming range so that the paraxial lateral magnification of the second lens unit takes a positive sign at any zooming position. This produces the advantage of shortening the back focal distance. Thus, the size of the zoom lens is minimized.

Though the objects of the present invention are accomplished when the above-stated conditions are satisfied, in order to achieve a further improvement, it is preferred to satisfy the following conditions:

$$1 < f2/(f1+f2-e12T) < 4 \tag{1}$$

$$\tfrac{1}{3}fW < e12W + e23W < fW \tag{2}$$

where f1 and f2 are the focal lengths of the first and second lens units, respectively, fW is the shortest focal length of the entire system, e12W and e23W are the intervals between the principal points of the first and second lens units and between the principal points of the second and third lens units, respectively, when in the wide angle end, and e12T is the interval between the principal points of the first and second lens units when the telephoto end.

Assuming that the object is at infinity, and letting e12 denote the interval between the principal points of the first and second lens units, the paraxial lateral magnification $\beta2$ of the second lens unit is expressed by $$\beta2 = f2/(f1+f2-e12)$$

In the present invention, the first and second lens units are so constructed and so arranged that $f1+f2-e12<0$ is always established during zooming to allow for the paraxial lateral magnification $\beta2$ to take positive values over the entire zooming range. Further, a range for the refractive powers of the first and second lens units is given by the inequalities of condition (1). When these conditions are satisfied, an improved result in shortening the total length of the lens is attained. When the upper limit of the inequalities of condition (1) is exceeded, the combined focal length of the first and second lens units is too long to minimize the back focal distance. When the lower limit is exceeded, e12T>f1 results. Therefore, the separation between the first and second lens units when in the telephoto end is too long, causing the total length of the lens to increase objectionably.

Inequalities of condition (2) give a range for the sum of the principal point intervals between the successive two lens units to determine a proper total length of the lens. When the upper limit of the inequalities of condition (2) are exceeded, the total length of the lens is too long to achieve a zoom lens of small size with ease. When the lower limit is exceeded, though the total length of the lens is short, all the lens-units are too close to each other. To avoid mechanical interference between the adjacent lens units, the convex curvature of that surface of the first or third lens unit which faces the diaphragm must be made strong. This results in producing objectionably large distortion.

To achieve good stability of aberrations over the entire zooming range, it is preferred that the first lens unit is constructed with, from front to rear, either positive, negative and positive lenses, or positive, positive and negative lenses, and the second lens unit is constructed with its front lens in the form of a meniscus-shaped lens of negative power.

As has been described above, according to the present invention, it is possible to achieve a compact zoom lens well corrected for aberrations, which lens enables its operating mechanism to be constructed in simple form and a prescribed zoom ratio to be obtained easily.

Six specific zoom lenses of the invention can be constructed in accordance with the numerical data given in tables below for the radii of curvature, R, the axial thicknesses and air separations D, and the refractive indices, N, and Abbe numbers, $\nu$, of the glasses of the lens elements, with the subscripts numbered consecutively from front to rear.

Figure 9A:
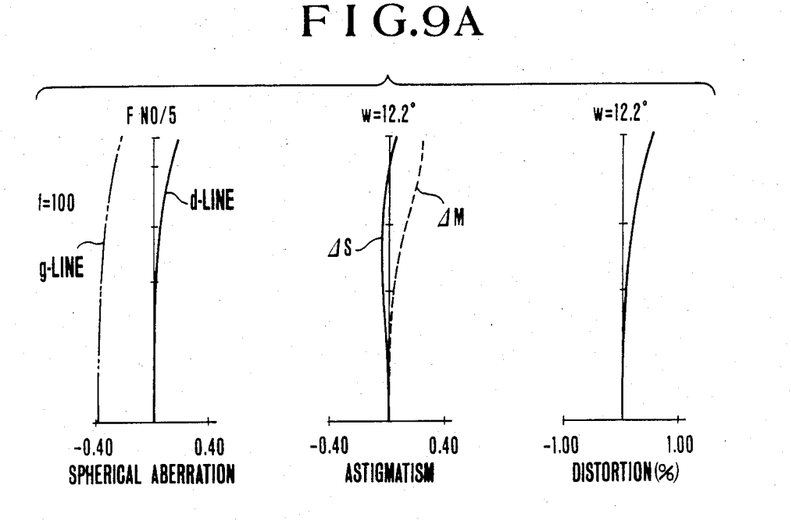
Figure 9B:
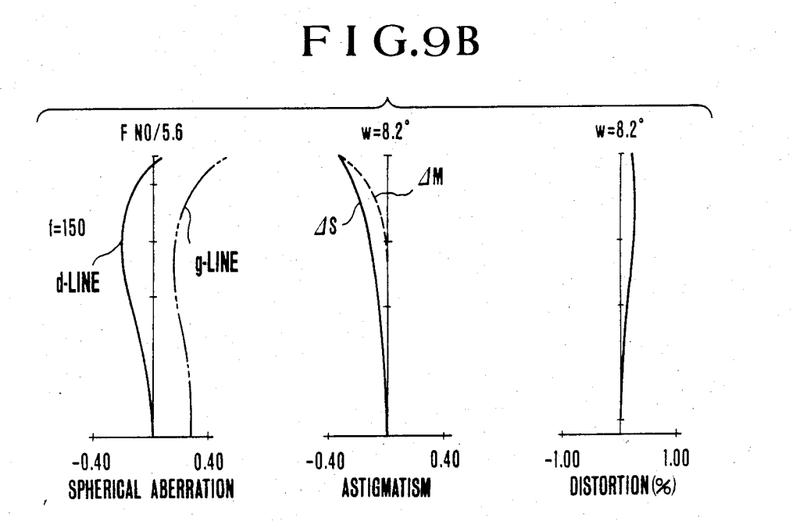

Numerical Example 1 (FIG. 3, FIG. 9)
f = 100–150   F.NO. = 1:5.0–5.6   2ω = 24.4°–16.4°

Figure 3:
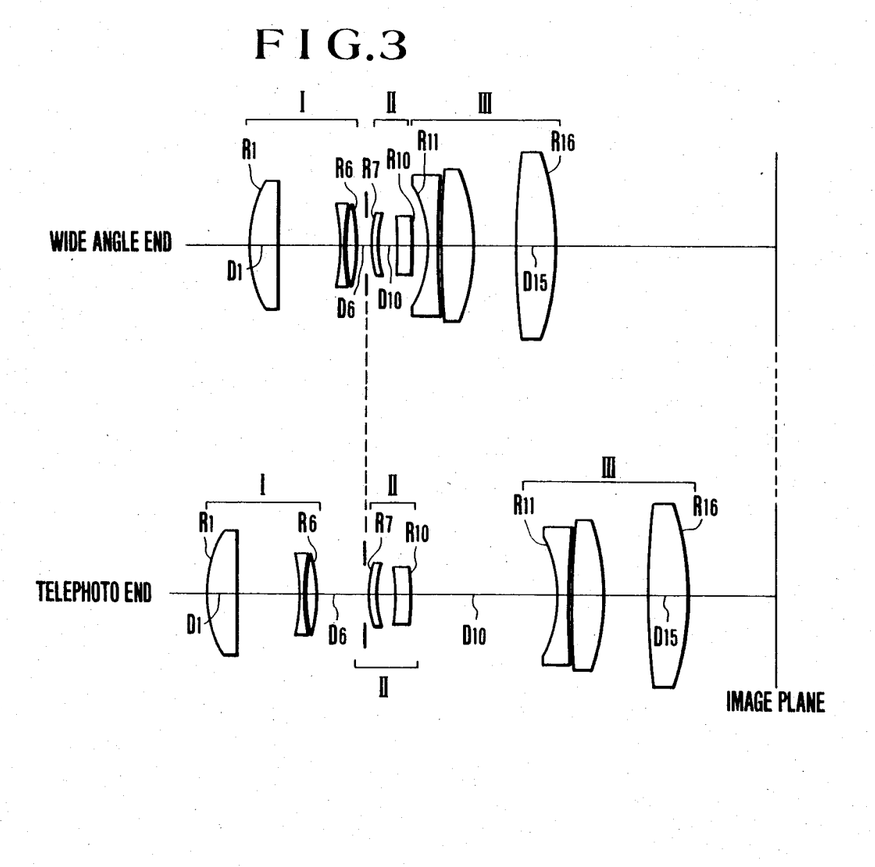
FIGS. 3 to 8 are longitudinal section views of examples 1 to 6 of specific zoom lenses of the invention.

| | | |
|---|---|---|
| R1 = 42.98 | D1 = 6.51 | N1 = 1.71300  ν1 = 53.8 |
| R2 = 1359.36 | D2 = 16.10 | |
| R3 = −47.51 | D3 = 0.98 | N2 = 1.68893  ν2 = 31.1 |
| R4 = 71.10 | D4 = 0.28 | |
| R5 = 97.53 | D5 = 2.22 | N3 = 1.74400  ν3 = 44.7 |
| R6 = −62.76 | D6 = 4.13–13.69 | |
| R7 = 38.74 | D7 = 1.16 | N4 = 1.76182  ν4 = 26.6 |
| R8 = 22.83 | D8 = 4.97 | |
| R9 = −84.80 | D9 = 3.73 | N5 = 1.84666  ν5 = 23.9 |
| R10 = −108.67 | D10 = 3.78–37.63 | |
| R11 = −32.96 | D11 = 3.73 | N6 = 1.54771  ν6 = 62.9 |
| R12 = 481.30 | D12 = 0.19 | |
| R13 = 553.87 | D13 = 7.49 | N7 = 1.83400  ν7 = 37.2 |
| R14 = −61.86 | D14 = 11.37 | |
| R15 = 184.33 | D15 = 10.56 | N8 = 1.71300  ν8 = 53.8 |
| R16 = −74.38 | | |
| f = 100–150 | e12W = 31.25 | |
| f1 = 78.1250 | e23W = 37.50 | |
| f2 = −65.7895 | | |
| f3 = 73.1013 | | |

Figure 10A:
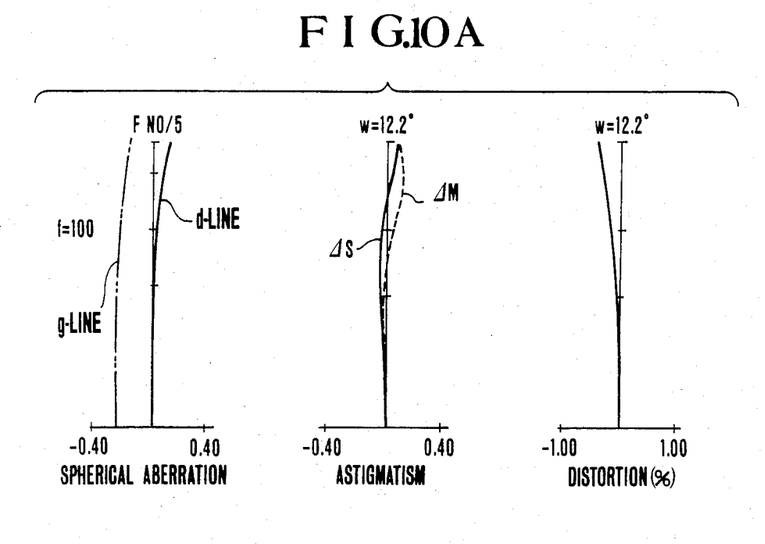
Figure 10B:
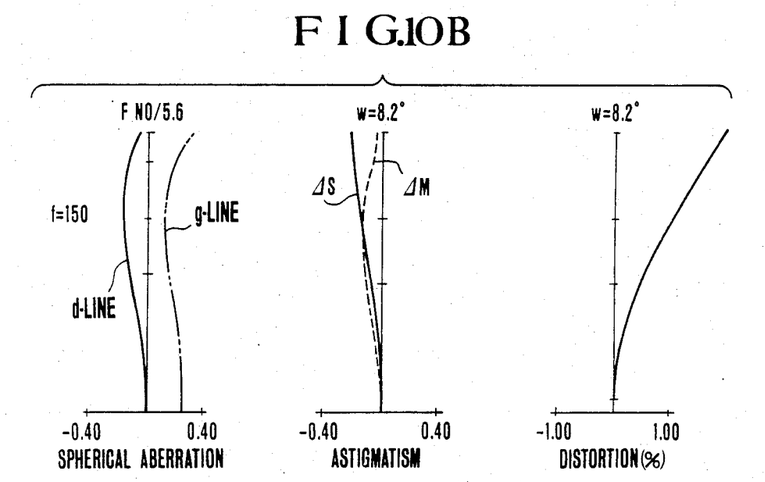

Numerical Example 2 (FIG. 4, FIG. 10)
f = 100–150   F.NO. = 1:5.0–5.6   2ω = 24.4°–16.4°

Figure 4:
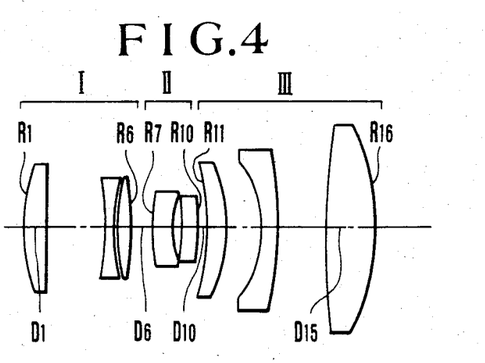

| | | |
|---|---|---|
| R1 = 45.92 | D1 = 5.32 | N1 = 1.71300  ν1 = 53.8 |
| R2 = 4262.99 | D2 = 13.77 | |
| R3 = −61.85 | D3 = 2.73 | N2 = 1.68893  ν2 = 31.1 |
| R4 = 75.32 | D4 = 1.05 | |
| R5 = 111.98 | D5 = 2.35 | N3 = 1.74400  ν3 = 44.7 |
| R6 = −71.50 | D6 = 4.91–14.476 | |
| R7 = 36.63 | D7 = 4.76 | N4 = 1.76182  ν4 = 26.6 |
| R8 = 22.91 | D8 = 2.60 | |
| R9 = −27.84 | D9 = 3.57 | N5 = 1.84666  ν5 = 23.9 |
| R10 = −35.63 | D10 = 2.28–36.13 | |
| R11 = −54.56 | D11 = 4.71 | N6 = 1.83400  ν6 = 37.2 |
| R12 = −32.72 | D12 = 8.57 | |
| R13 = −25.40 | D13 = 3.70 | N7 = 1.59037  ν7 = 64.7 |
| R14 = −78.71 | D14 = 11.22 | |
| R15 = 239.69 | D15 = 11.26 | N8 = 1.80069  ν8 = 56.0 |
| R16 = −58.59 | | |
| f = 100–150 | e12W = 31.25 | |
| f1 = 78.1250 | e23W = 37.50 | |
| f2 = −65.7895 | | |
| f3 = 73.1013 | | |

Figure 11A:
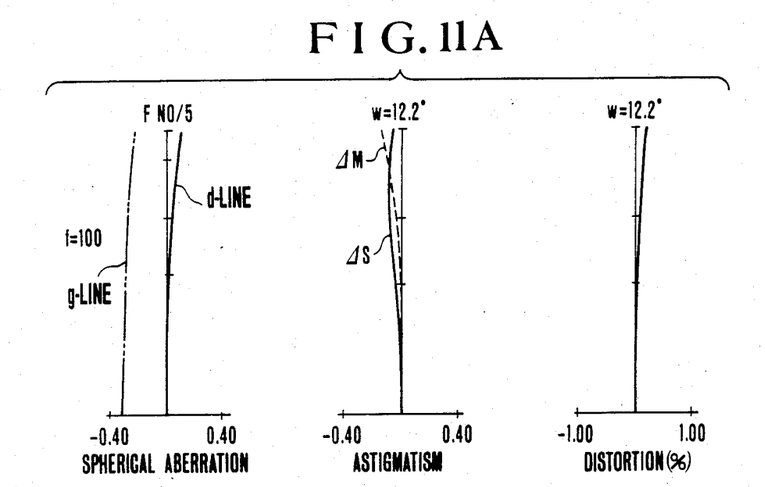
Figure 11B:
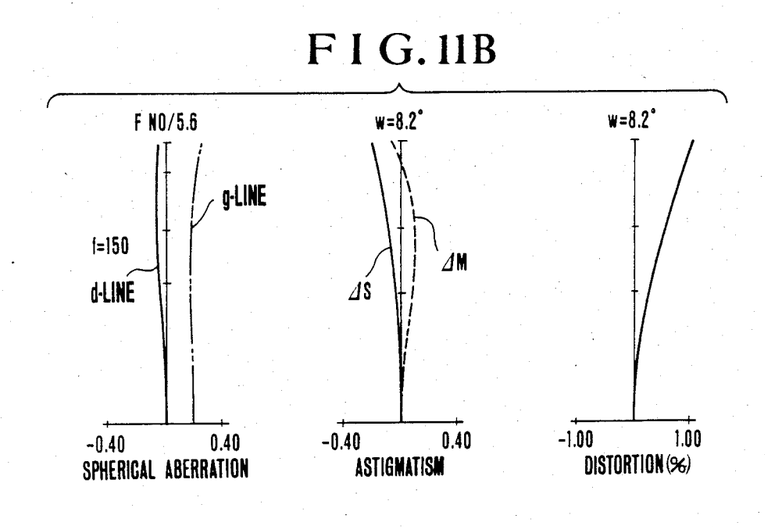

Numerical Example 3 (FIG. 5, FIG. 11)
f = 100–150   F.NO. = 1:5.0–5.6   2ω = 24.4°–16.4°

Figure 5:
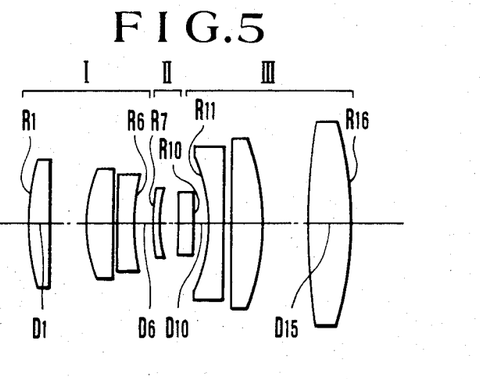

| | | |
|---|---|---|
| R1 = 58.55 | D1 = 4.69 | N1 = 1.74400  ν1 = 44.7 |
| R2 = 4312.23 | D2 = 8.64 | |
| R3 = 33.51 | D3 = 6.82 | N2 = 1.54771  ν2 = 62.9 |
| R4 = 414.82 | D4 = 0.57 | |
| R5 = −3571.51 | D5 = 3.74 | N3 = 1.69895  ν3 = 30.1 |
| R6 = 37.04 | D6 = 4.76–14.33 | |
| R7 = 51.98 | D7 = 1.23 | N4 = 1.76182  ν4 = 26.6 |
| R8 = 25.81 | D8 = 4.71 | |
| R9 = −102.79 | D9 = 3.73 | N5 = 1.84666  ν5 = 23.9 |
| R10 = −115.91 | D10 = 3.55–37.40 | |
| R11 = −35.38 | D11 = 3.76 | N6 = 1.54771  ν6 = 62.9 |
| R12 = −371.36 | D12 = 1.76 | |
| R13 = −3124.65 | D13 = 6.71 | N7 = 1.83400  ν7 = 37.2 |
| R14 = −67.70 | D14 = 11.26 | |
| R15 = 151.47 | D15 = 10.00 | N8 = 1.71300  ν8 = 53.8 |
| R16 = −87.38 | | |
| f = 100–150 | e12W = 31.25 | |
| f1 = 78.1250 | e23W = 37.50 | |
| f2 = −65.7895 | | |
| f3 = 73.1013 | | |

Figure 12A:
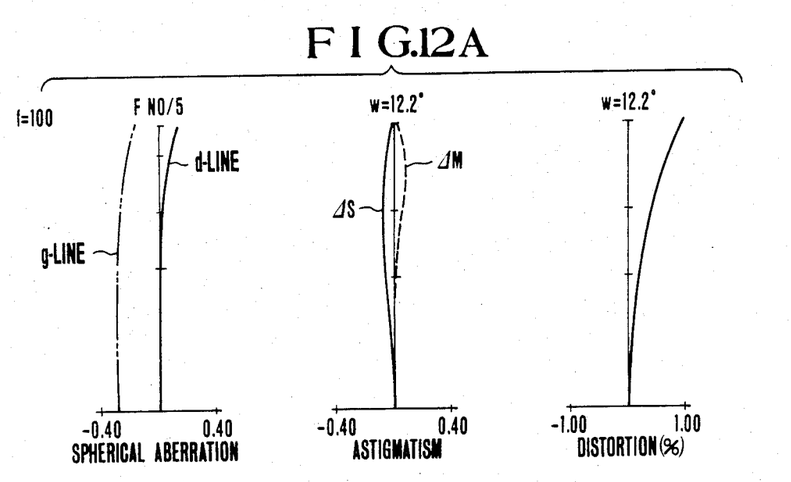
Figure 12B:
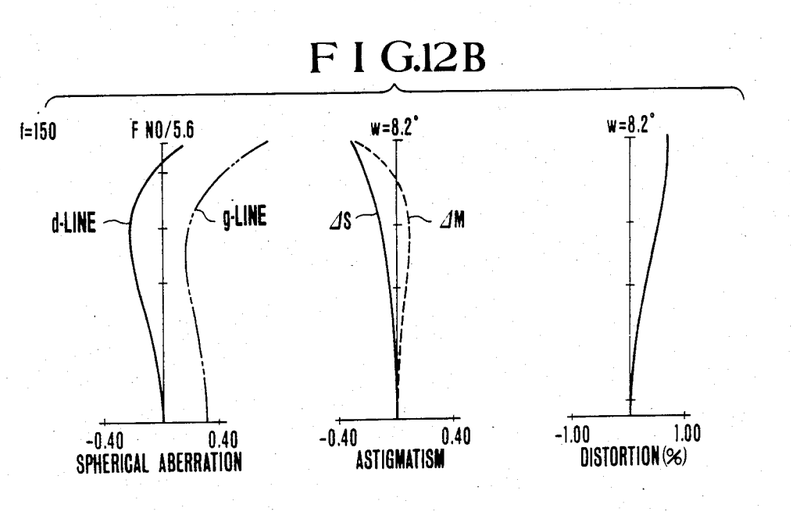

Numerical Example 4 (FIG. 6, FIG. 12)
f = 100–150   F.NO. = 1:5.0–5.6   2ω = 24.4°–16.4°

Figure 6:
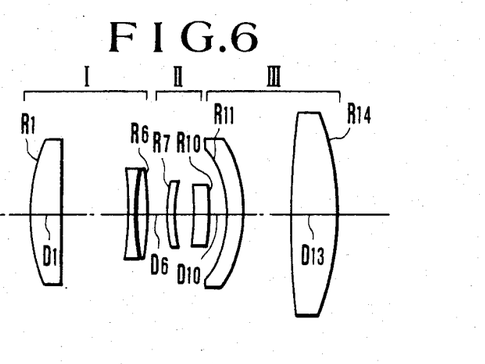

| | | |
|---|---|---|
| R1 = 43.31 | D1 = 6.88 | N1 = 1.71300  ν1 = 53.8 |
| R2 = 2581.29 | D2 = 16.82 | |
| R3 = −41.51 | D3 = 0.95 | N2 = 1.68893  ν2 = 31.1 |
| R4 = 70.08 | D4 = 0.28 | |
| R5 = 113.59 | D5 = 2.40 | N3 = 1.74400  ν3 = 44.7 |
| R6 = −50.05 | D6 = 5.05–14.62 | |
| R7 = 56.72 | D7 = 1.34 | N4 = 1.76182  ν4 = 26.6 |
| R8 = 25.75 | D8 = 4.89 | |
| R9 = −50.15 | D9 = 3.77 | N5 = 1.84666  ν5 = 23.9 |
| R10 = −51.57 | D10 = 4.31–38.16 | |
| R11 = −25.60 | D11 = 3.816 | N6 = 1.71300  ν6 = 53.8 |
| R12 = −32.41 | D12 = 11.297 | |
| R13 = 235.78 | D13 = 11.25 | N7 = 1.83400  ν7 = 37.2 |
| R14 = −65.41 | | |
| f = 100–150 | e12W = 31.25 | |
| f1 = 78.1250 | e23W = 37.50 | |
| f2 = −65.7895 | | |
| f3 = 73.1013 | | |

Figure 13A:
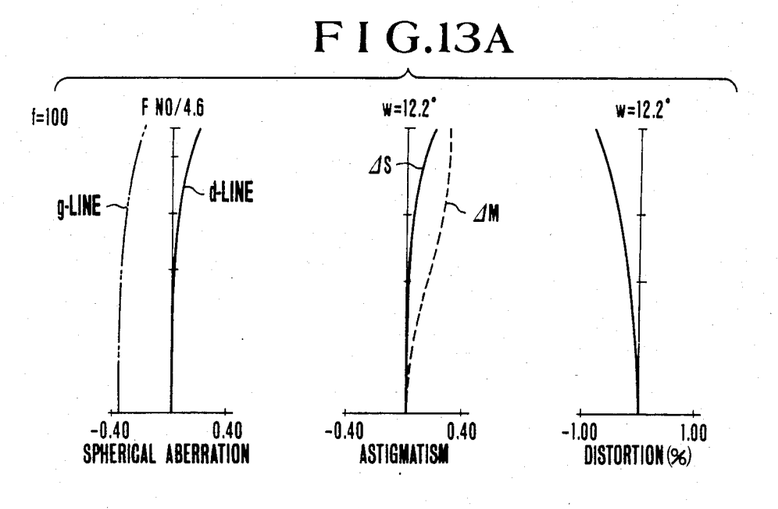
Figure 13B:
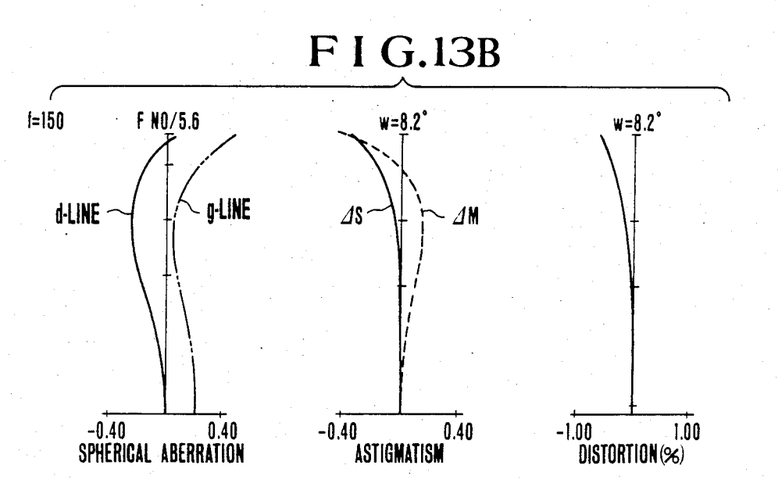

Numerical Example 5 (FIG. 7, FIG. 13)
f = 100–150   F.NO. = 1:4.6–5.6   2ω = 24.4°–16.4°

Figure 7:
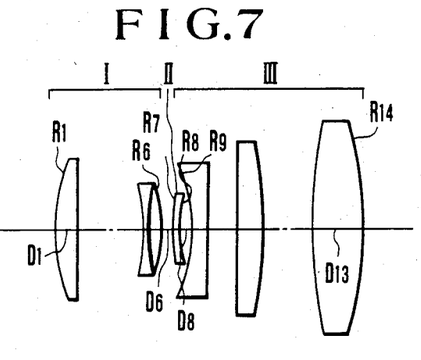

| | | |
|---|---|---|
| R1 = 40.99 | D1 = 5.39 | N1 = 1.71300  ν1 = 53.8 |
| R2 = 1273.66 | D2 = 16.10 | |
| R3 = −47.59 | D3 = 0.98 | N2 = 1.68893  ν2 = 31.1 |
| R4 = 69.61 | D4 = 0.32 | |
| R5 = 106.20 | D5 = 1.89 | N3 = 1.74400  ν3 = 44.7 |
| R6 = −64.76 | D6 = 3.54–13.10 | |
| R7 = 49.46 | D7 = 1.23 | N4 = 1.76182  ν4 = 26.6 |
| R8 = 24.62 | D8 = 3.20–37.05 | |
| R9 = −36.64 | D9 = 4.19 | N5 = 1.54771  ν5 = 62.9 |
| R10 = −567.60 | D10 = 6.52 | |
| R11 = 406.96 | D11 = 6.50 | N6 = 1.83400  ν6 = 37.2 |
| R12 = −109.74 | D12 = 11.85 | |
| R13 = 121.48 | D13 = 11.96 | N7 = 1.71300  ν7 = 53.8 |
| R14 = −89.83 | | |
| f = 100–150 | e12W = 31.25 | |
| f1 = 78.1250 | e23W = 37.50 | |
| f2 = −65.7895 | | |
| f3 = 73.1013 | | |

Figure 14A:
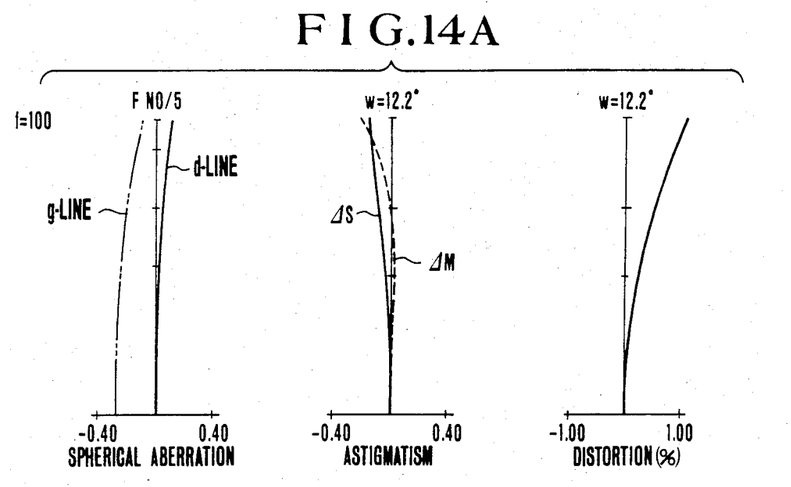
Figure 14B:
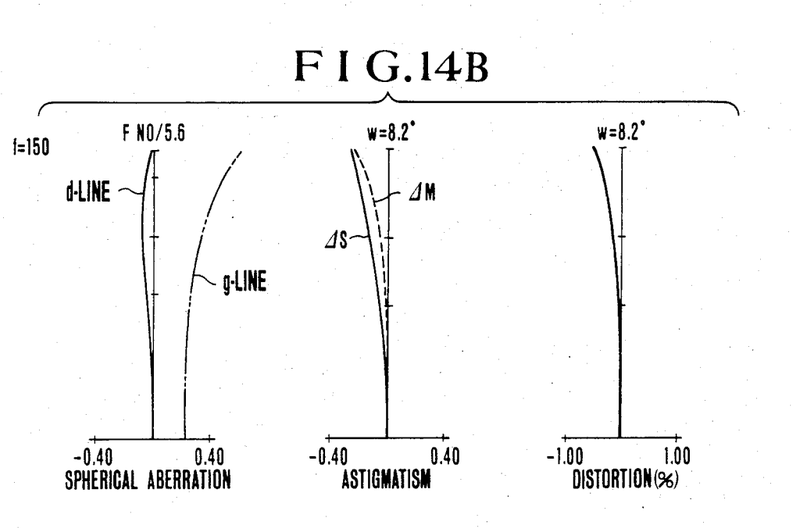

Numerical Example 6 (FIG. 8, FIG. 14)
F = 100–150   F.NO. = 1:5.0–5.6   2ω = 24.4°–16.4°

Figure 8:
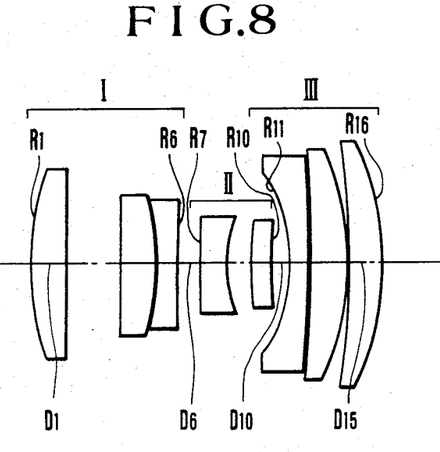

| | | |
|---|---|---|
| R1 = 49.98 | D1 = 6.15 | N1 = 1.77250  ν1 = 49.6 |
| R2 = 4448.22 | D2 = 10.11 | |
| R3 = −951.99 | D3 = 6.23 | N2 = 1.56384  ν2 = 60.7 |
| R4 = −46.61 | D4 = 0 | |

-continued

Numerical Example 6 (FIG. 8, FIG. 14)
F = 100-150   F.NO. = 1:5.0-5.6   2ω = 24.4°-16.4°

| | | |
|---|---|---|
| R5 = −46.61 | D5 = 3.75 | N3 = 1.69895  ν3 = 30.1 |
| R6 = 158.91 | D6 = 4.24-19.96 | |
| R7 = 102.36 | D7 = 5.01 | N4 = 1.69895  ν4 = 30.1 |
| R8 = 28.64 | D8 = 4.04 | |
| R9 = 50.13 | D9 = 3.75 | N5 = 1.84666  ν5 = 23.9 |
| R10 = 113.19 | D10 = 3.56-43.43 | |
| R11 = −28.14 | D11 = 3.70 | N6 = 1.56732  ν6 = 42.8 |
| R12 = 257.69 | D12 = 0 | |
| R13 = −257.69 | D13 = 7.11 | N7 = 1.77250  ν7 = 49.6 |
| R14 = −45.34 | D14 = 0.10 | |
| R15 = −185.70 | D15 = 5.79 | N8 = 1.77250  ν8 = 49.6 |
| R16 = −44.33 | | |
| f = 100-150 | | e12W = 37.50 |
| f1 = 104.166 | | e23W = 31.25 |
| f2 = −138.8892 | | |
| f3 = 96.6453 | | |

It will be appreciated that in the present invention, a zoom lens is constructed with three lens units whose refractive powers fall within the prescribed ranges, the diaphragm remains stationary during zooming, and the first and third lens units move forward and rearward, respectively, when zooming from the wide angle to the telephoto end. The advantages are that the operating mechanisms for the lens and the diaphragm are constructed in simplified form, and a large reduction in the total length of the lens is achieved, while still permitting a zoom ratio of about 1.5 and an F-number of about 5.

What is claimed is:

1. A zoom lens comprising, from front to rear, a positive first lens unit, a negative second lens unit, a positive third lens unit and a diaphragm between said first and said third lens units,
the axial separation between said first and said second lens units and the axial separation between said second and said third lens units being both monotonically increased when zooming from a minimum focal length to a maximum focal length, said second lens unit being held stationary during zooming.

2. A zoom lens according to claim 1, satisfying the following conditions:

$$1 < f2/(f1+f2-e12T) < 4$$

$$\tfrac{1}{2} fW < e12W + e23W < fW$$

where f1 and f2 are focal lengths of said first and said second lens units, respectively; fW is minimum focal length of the entire system; e12W and e23W are principal points intervals between said first and second lens units and between said second and said third lens units, respectively, when in a wide angle end; and e12T is a principal point interval between said first and said second lens units when in a telephoto end.

3. A zoom lens comprising:
a positive frontmost lens unit arranged to move axially forward when zooming from a minimum focal length to a maximum focal length;
a negative middle lens unit stationary during zooming;
a positive rearmost lens unit arranged to move axially rearward at the same time with said frontmost lens unit when zooming from the minimum focal length to the maximum focal length; and
a stationary diaphragm located between said frontmost lens unit and said rearmost lens unit.

4. A zoom lens according to claim 3, wherein the combined refractive power of said frontmost lens unit and said middle lens unit is always positive regardless of the movement of said frontmost lens unit.

5. A zoom lens according to claim 3, wherein a pencil of rays transferring from said frontmost lens unit to said middle lens unit and a pencil of rays transferring from said middle lens unit to said rearmost lens unit are both convergent pencils.

* * * * *